Dec. 11, 1962  G. L. BALL III, ET AL  3,068,434
ELECTRICAL DEVICES
Filed May 17, 1961
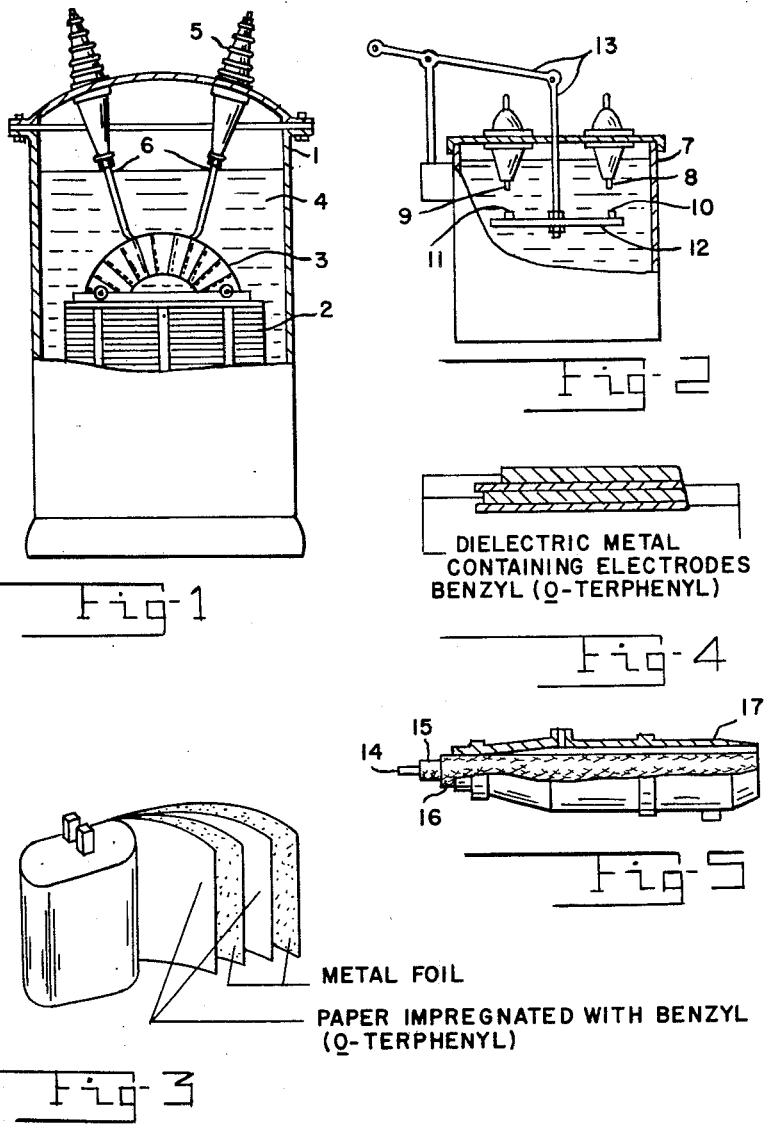
INVENTORS
GEORGE L. BALL, III
GLENN R. WILSON
BY
Mary B. Moshier
AGENT United States Patent Office 3,068,434
Patented Dec. 11, 1962

3,068,434
ELECTRICAL DEVICES
George L. Ball III, Medford, and Glenn R. Wilson, Cambridge, Mass., assignors, by mesne assignments, to Monsanto Research Corporation, Everett, Mass., a corporation of Delaware
Filed May 17, 1961, Ser. No. 110,783
13 Claims. (Cl. 336—94)

The present invention relates to electrical devices and more particularly deals with apparatus comprising a combination of electricity conducting elements and dielectric insulating and encapsulating medium therefor.

The use of a dielectric is required in certain electrical equipment for the purpose of removing heat and of allowing the making of electrical contact in the absence of air or of explosive mixtures. The requirements for such dielectrics are among other things very high resistance to the flow of electric currents, high stability to atmospheric conditions at ordinary and at somewhat elevated temperatures, high resistance to thermal decomposition, low coefficient of thermal expansion, low vapor pressure, low congealing temperature, low inflammability and high flash point. Preferably the dielectric should be a mobile liquid even at relatively low temperatures and should be a good heat transfer agent. A satisfactory dielecrtic liquid should not sludge or undergo deleterious change during use. For example, when a capacitor is impregnated with a thermally unstable dielectric, under high operating temperatures and direct current voltages, deterioration of the dielectric results in an ever increasing current leakage, a short capacitor life, corrosion of the electrodes, etc. Moreover, in the case of capacitors operating on alternating current, the decomposition sometimes results in an excessive increase in power factor of the dielectric material.

It is, therefore, an object of the present invention to provide a method for the insulation of elements in electrical apparatus wherein the above objectionable properties are either completely eliminated or substantially reduced. An additional object is to provide transformers, capacitors, circuit breakers, cables, switches, fuses, reactors, regulators and the like wherein the deleterious effects caused by unstable dielectric material, such as the deterioration of metal parts, paper insulation, etc., is eliminated or materially reduced. Still another object is to provide electrical apparatus having a long, useful life and good dielectric stability. A further object is to provide a means for suppressing corona discharge in capacitors. Still a further object is the provision of a liquid dielectric composition suitable for encapsulating, i.e., potting, electronic circuits or components, which composition dissipates (without thermal decomposition) the heat generated with the electronic circuits, e.g., hot power tubes, and at the same time is unaffected by moisture of the atmosphere. An important objective of the invention is the provision of encapsulating material for electrical equipment, for instance, transformers, motor stators, coils, printed circuits, etc.

According to the invention, these and other objects which will be hereinafter disclosed are provided by the following invention wherein there is provided electrical apparatus comprising, in combination, conducting elements disposed in spaced relationship to each other and adapted during operation of the apparatus to have a difference in electrical potential therebetween, and monobenzylterphenyl interposed between said elements for insulating one from the other. The insulating agent, i.e., the dielectric medium of the present apparatus is advantageously one wherein the liquid portion of which consists of at least 50% by weight of monobenzylterphenyl.

So far as is known, the monobenzylterphenyls are previously unknown compounds. According to this invention they are obtained by reaction of a benzyl halide with a terphenyl, i.e o- m- or p-terphenyl in the presence of an acidic metal halide catalyst substantially according to the scheme:

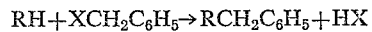

in which R denotes the terphenylyl radical, $C_6H_5$ denotes the phenyl radical, and X is halogen, i.e., bromine, chlorine, fluorine and iodine.

Metal halides which are useful as catalysts are generally of the Friedel-Crafts type, e.g., aluminum chloride or bromide, zinc chloride or fluoride, ferric bromide, titanium chloride, zirconium iodide or bromide, stannic chloride or bromide. Either o-, m- or p-terphenyl may be employed, and the benzyl halide component may be the chloride, fluoride, bromide or iodide. Reaction between the terphenyl and the benzyl halide is preferably effected in the presence of an inert diluent or solvent and at temperatures which may range from, say 60° C. to 200° C. Advantageously, the reaction mixture may first be refluxed in a relatively low boiling solvent and the reaction completed by distilling off the solvent and heating the residue at a higher temperature than that permitted by operating in presence of a solvent, e.g., at up to 200° C. At these high temperatures, unreacted material is removed, and a purer product is obtained. Examples of the presently useful diluents or solvents are, e.g., petroleum ether, nitrobenzene, ethyl or isopropyl ether, acetone, carbon tetrachloride, hexachloroethane, etc.

Since the benzylterphenyl is obtained by reaction of one mole of the terphenyl with one mole of the benzyl halide, the two reactants are advantageously employed in such stoichiometric proportions. However, any excess of either may be employed, since any unreacted material can be readily separated from the reaction product, e.g., by distillation, solvent extraction, etc.

When reaction has been completed, which point can be ascertained by noting cessation of hydrogen halide evolution, change in viscosity index, etc., the benzylterphenyl may be recovered from the reaction mixture by isolating procedures known to those skilled in the art, e.g., the entire reaction mixture may be added to ice—hydrochloric acid to break up the catalyst complex, the organic material may be extracted and the benzylterphenyl obtained as residue by distilling off the solvent. Purification of the benzylterphenyl may be subsequently effected, if desired, by treatment with charcoal, Fuller's earth, iron powder, etc.

The presently provided mono-benzylterphenyls are stable, well-characterized materials which are high-boiling, very heat-stable materials which possess excellent dielectric properties, low dissipation factors, and little, if any, change in thermal expansion over wide temperature ranges. They are thus admirably suited as insulating and encapsulating agents in the electrical and electronics industries.

The invention is further illustrated by, but not limited to, the following examples:

*Example 1*

A mixture consisting of 1.5 moles of o-terphenyl (freshly distilled over sodium) and 0.5 mole of benzyl chloride was refluxed for 8 hours in carbon tetrachloride solution and in the presence of 0.2 g. of anhydrous aluminum chloride as catalyst. The solvent was then removed by distillation and the remainder was heated to about 175° C. in order to complete the reaction and to drive out unreacted material. The residue thus obtained was dissolved in carbon tetrachloride and washed successively with dilute hydrochloric acid, aqueous sodium carbonate, and water. Removal of the carbon tetrachloride from the organic layer and distillation of the residue gave the substantially pure mono-benzyl-o-terphenyl, B.P., 193–212° C./0.1 mm., a viscous oil, $n_D^{20.2}$ 1.6497 and analyzing 93.8% carbon and 6.2% hydrogen as against 93.8% and 6.1% the respective calculated values.

Mono-benzyl-m-terphenyl or mono-benzyl-p-terphenyl are prepared similarly by using m-terphenyl or p-terphenyl instead of the o-terphenyl used above.

In another run, isolation and purification of the mono-benzyl-o-terphenyl was conducted, also very satisfactorily as follows: After the temperature of the reaction mixture had been carried to 175° C. for removal of excess o-terphenyl, the reaction mixture was heated with 10 g. of iron powder for 2 hours at 250° C. and then for 2 hours at 300° C. Upon cooling, the residue was diluted with benzene, fuller's earth was added, and the whole was refluxed for 1 hour at 100° C. Filtration and distillation of the filtrate gave the mono-benzyl-o-terphenyl.

The mono-benzyl-o-terphenyl which was prepared in the second run was determined to possess a dielectric constant of 2.66 to 2.18 at 100 kc. over a temperature range of 65° C. to 400° C., a dissipation factor ranging from 0.003% to 0.089% over the same temperature range and at the same frequency, and a dielectric strength (on the American Society for Testing Materials Scale) of 41 kv. at 23° C. and 31 kv. at 370° C.

The test apparatus for measurement of the dielectric constant and dissipation factor was a high temperature liquid cell used in conjunction with a bridge network. The cell was a concentric cylindrical capacitor made of gold-plated Monel metal using quartz to insulate the electrodes from each other. Connecting lines were commercially available low loss lines to assure rigid reproducibility in the capacitance of the test cells, and adaptors were employed instead of conventional pin connectors. The connecting lines were free of any material, e.g., insulating beads, which might deteriorate or be ineffective at the high temperatures employed for the tests. The temperature measurements were made with an accuracy of ±5° C. This limit of accuracy represented the maximum temperature difference between the inner and outer electrodes of the cell.

Owing to the high-testing temperatures, the cell used in American Society for Testing Materials (ASTM) Method D-877-49 for measurements of dielectric breakdown was modified as follows: Spherical electrodes, 0.5″ in diameter and spaced 0.040″±0.0001″ apart were used instead of flat electrodes with 0.1″ spacing. The breakdown voltage was measured by increasing the voltage across the gap at a rate of 500 volts/second until a break occurred. Correlation between the values obtained with the ASTM cell and the presently employed modified cell was determined from a long series of experiments. Those determined with the modified cell were very approximately ½ of the values obtained with the ASTM cell. For convenience, the dielectric strength values reported above are on the ASTM scale, i.e., they are twice the values actually obtained with the modified cell.

That no substantial variation in electrical properties results from a change in frequency is shown by the following values obtained with the mono-benzyl-o-terphenyl at the frequencies and temperatures shown below:

| Temperature, ° C. | Dielectric Constant, at— | | |
|---|---|---|---|
| | 1 kc. | 10 kc. | 100 kc. |
| 65 | 2.66 | 2.66 | 2.66 |
| 100 | 2.63 | 2.63 | 2.63 |
| 150 | 2.52 | 2.52 | 2.52 |
| 200 | 2.45 | 2.45 | 2.45 |
| 250 | 2.38 | 2.38 | 2.38 |
| 300 | 2.32 | 2.32 | 2.32 |
| 350 | 2.27 | 2.25 | 2.25 |
| 400 | 2.20 | 2.18 | 2.18 |

It is evident from the above that the curve of dielectric constant versus temperature and frequency is surprisingly flat.

The very good thermal stability of the mono-benzyl-o-terphenyl was established by aging it at 350° C. for 938 hours. Only negligible changes in dielectric constant and dissipation factor were noted.

The presently provided mono-benzylterphenyls are thus valuable for use in capacitors which are destined for exposure to wide temperature ranges and to fluctuation in frequencies. They are particularly useful in that even at temperatures of up to 400° C. there is negligible dielectric loss; hence, they are advantageously employed as potting liquids in high temperature transformers, as liquid dielectric materials for use at elevated temperatures in mica capacitors, etc.

The mono-benzylterphenyls are of general utility as dielectric media when interposed in electrical apparatus between metallic conducting elements that have a difference in potential during operation of the apparatus. They are valuable as liquid impregnants in capacitor and cable manufacture, as transformer coolants, in the fabrication of switch gear, etc.

Characteristics of the present mono-benzylterphenyls are such as to render them useful as impregnants for cellulosic materials, e.g., wood pulp, paper, cotton, cotton fabric, cellulose acetate fibers and textiles, whereby there are obtained materials which possess dielectric constants that are higher than that of either the cellulosic material before impregnation or of the liquid dielectric. However, since the presently provided mono-benzylterphenyls are distinguished by resistance to very high temperatures, i.e., temperatures which are not generally tolerated by the cellulosic materials, the more profitable utilization of the benzylterphenyls is in connection with the type of materials encountered in high temperature applications, e.g., ceramic and other refractory materials, mica, fused silicas, asbestos, highly fluorinated polymers such as Teflon, etc.

For example, the present mono-benzylterphenyls are useful in a capacitor made up of alternate layers of metal foil such as aluminum or tin foil separated by mica. Thus a thin, aluminum foil (about 0.0003″ in thickness) is covered with a paste of powdered mica and the mono-benzylterphenyl, and another sheet of the foil is placed thereon so that the two sheets of metal foil are separated from each other by the paste. This is then covered by another layer of the paste and the stack of alternating layers of metal foil and paste thus obtained is wound into a cylindrical roll. This is placed into a container, and at this point electrical connecting means, e.g., wire or bar connectors, depending upon the size of the assembly, may be connected to the metal foil in known manner. After drying, preferably in a heated vacuum oven, one of the present mono-benzylterphenyls, e.g., mono-benzyl-m-terphenyl, is added in a quantity sufficient to fill all interstices. The container is then sealed.

Alternatively, and particularly in the manufacture of large items, sheets of conducting metal are arranged alternately with sheets of mica at spaced distances from each other within the container, the mono-benzylterphenyl is added, and the container is sealed.

In the manufacture of a transformer, the core with electrical windings or coil is positioned within the housing or tank, lead-in bushings are provided and suitable leads are connected to the coil assembly and the mono-benzylterphenyl compound, e.g., mono-benzyl-o-terphenyl is added to the housing, immersing the components contained therein.

In a switch assembly, fixed contacts and movable contacts cooperating therewith are housed in a casing, the movable contacts being mounted upon a support which is operatively connected to external actuating levers. The casing is filled with mono-benzyl-o-terphenyl, which serves not only to insulate the elements from each other but also to suppress corona discharge.

In a cable suitable for high temperature, the conducting elements are insulated by asbestos felt which has been impregnated with mono-benzyl-p-terphenyl and contained in a casing of a tetrafluorethylene polymer, e.g., Teflon, or another suitable, flexible, heat-resistant material.

The presently provided mono-benzylterphenyls are useful as liquid encapsulating materials for electrical components generally. They are non-hygroscopic, unaffected by air, stable over wide temperature ranges, and non-corrosive to the electrical components. Hence, they serve not only as liquid coolants and insulating media but also as encapsulating or potting means. This insures the continued high quality of the electrical apparatus, even though it has been repeatedly used and stored for long periods of time.

As hereinbefore disclosed, the mono-benzylterphenyls have been employed as the sole dielectric media. However, they may be employed alone, or they may be combined with other dielectric agent, depending upon the anticipated conditions of operation. They may be combind with other dielectric agents, depending upon the other liquid dielectric media such as certain liquid petroleum hydrocarbons, the partially chlorinated biphenyls, the chlorinated terphenyls, the chlorinated paraffinic hydrocarbons, chlorinated diphenylethane, the tetrahydrofurfuryl ethers of the chlorophenols, trichlorobenzene, etc. However, for use in the higher temperature ranges, admixture of the terphenyls with the halogenated compounds is generally unadvisable, and when prolonged storage is contemplated, admixture with the readily oxidizable paraffinic hydrocarbons is not generally recommended.

Although several specific types of electrical apparatus comprising the mono-benzylterphenyls have been disclosed by way of illustrating the principles of the present invention, additional applications of these principles within the scope of the appended claims will be readily apparent to those skilled in the art.

What we claim is:

1. A compound of the formula $RCH_2C_6H_5$ where R denotes the terphenylyl radical and $C_6H_5$ denotes the phenyl radical.

2. Mono-benzyl-o-terphenyl.

3. The process which comprises contacting terphenyl with a benzyl halide in the presence of a metallic halide as catalyst and recovering from the resulting reaction product a compound of the formula $RCH_2C_6H_5$ where R is the terphenyl radical and $C_6H_5$ denotes the phenyl radical.

4. The process which comprises heating o-terphenyl with a benzyl halide in the presence of an inert diluent and aluminum chloride as catalyst and recovering mono-benzyl-o-terphenyl from the resulting reaction product.

5. The process which comprises refluxing o-terphenyl with benzyl chloride in an inert diluent in the presence of aluminum chloride as catalyst and recovering mono-benzyl-o-terphenyl from the resulting reaction product.

6. Electrical apparatus comprising, in combination, metallic conducting elements disposed in spaced relationship to each other and adapted during operation of the apparatus to have a difference in potential therebetween, and interposed between said elements a compound of the formula $RCH_2C_6H_5$ where R is the terphenylyl radical and $C_6H_5$ denotes the phenyl nucleus.

7. A capacitor comprising conducting elements and insulating agent associated with each of the elements and isolating them from each other, said insulating agent comprising a compound of the formula $RCH_2C_6H_5$ where R is the terphenylyl radical and $C_6H_5$ denotes the phenyl nucleus.

8. A transformer comprising a core with electrical windings positioned in housing containing a compound of the formula $RCH_2C_6H_5$ where R is the terphenylyl radical and $C_6H_5$ denotes the phenyl radical.

9. An electrical switch comprising fixed and movable electrical contacts immersed in a compound of the formula $RCH_2C_6H_5$ wherein R is the terphenylyl radical and $C_6H_5$ denotes the phenyl radical.

10. Electrical apparatus comprising, in combination, metallic conducting elements disposed in spaced relationship to each other and adapted during operation of the apparatus to have a difference in potential therebetween, and mono-benzyl-o-terphenyl interposed between said elements.

11. A capacitor comprising conducting elements and mono-benzyl-o-terphenyl associated with each of the elements and isolating them from each other.

12. A transformer comprising a core with electrical windings positioned in a housing containing mono-benzyl-o-terphenyl.

13. An electrical switch comprising fixed and movable electrical contacts immersed in mono-benzyl-o-terphenyl.

No references cited.